US010491459B1

(12) United States Patent
Andreas et al.

(10) Patent No.: US 10,491,459 B1
(45) Date of Patent: Nov. 26, 2019

(54) SYSTEMS AND METHODS FOR ON-DEVICE ADAPTIVE SELF-EXECUTING DIAGNOSTICS TOOL

(71) Applicant: Sprint Communications Company L.P., Overland Park, KS (US)

(72) Inventors: Paul M. Andreas, Overland Park, KS (US); John E. Belser, Olathe, KS (US); Rodney D. Nelson, Overland Park, KS (US); Mark D. Peden, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 198 days.

(21) Appl. No.: 15/438,753

(22) Filed: Feb. 21, 2017

(51) Int. Cl.
| | |
|---|---|
| *H04L 12/24* | (2006.01) |
| *H04L 12/26* | (2006.01) |
| *H04L 29/08* | (2006.01) |
| *H04W 24/08* | (2009.01) |

(52) U.S. Cl.
CPC ............ *H04L 41/069* (2013.01); *H04L 41/22* (2013.01); *H04L 43/16* (2013.01); *H04L 67/303* (2013.01); *H04W 24/08* (2013.01)

(58) Field of Classification Search
CPC ....... H04L 41/069; H04L 41/22; H04L 43/16; H04L 67/303; H04W 24/08
USPC .......................................... 709/224; 370/225
See application file for complete search history.

(56) References Cited

U.S. PATENT DOCUMENTS

| | | | | |
|---|---|---|---|---|
| 7,960,945 B1* | 6/2011 | Onorato | ............. | G01R 31/3606 |
| | | | | 320/132 |
| 8,644,813 B1* | 2/2014 | Gailloux | ............... | H04W 24/08 |
| | | | | 455/115.1 |
| 9,185,584 B1* | 11/2015 | Ramamurthy | ........ | H04W 24/04 |
| 9,413,839 B2 | 8/2016 | Annan et al. | | |
| 9,639,412 B1* | 5/2017 | Levy | ..................... | H04L 43/065 |
| 9,674,063 B2* | 6/2017 | Navarette | ........... | H04L 43/0876 |
| 2008/0274716 A1* | 11/2008 | Fok | ........................ | H04W 12/08 |
| | | | | 455/410 |
| 2011/0110225 A1* | 5/2011 | Mihaly | ............... | H04L 12/5692 |
| | | | | 370/225 |
| 2011/0194427 A1* | 8/2011 | Shirota | ............. | H04W 36/0022 |
| | | | | 370/252 |
| 2012/0039299 A1* | 2/2012 | Teyeb | .................. | H04B 7/2606 |
| | | | | 370/331 |
| 2012/0117478 A1* | 5/2012 | Vadde | ...................... | G06F 9/54 |
| | | | | 715/736 |

(Continued)

*Primary Examiner* — Vivek Srivastava
*Assistant Examiner* — Binod J Kunwar

(57) ABSTRACT

A method comprises a client executing on a processor of a UE, where the client is monitoring an application log and communication log for a plurality of user applications and communication applications. The client measures a volume of transactions and a set of performance metrics associated with UE resource usage. The client generates a custom device profile that establishes baselines for each of the plurality of user applications and identifies any deviations from the baselines. The client creates a bounded threshold based on the deviations, and detects that at least one of the plurality of user applications has exceeded the bounded threshold. The client determines that the bounded threshold was exceeded based on an application trigger and a network trigger, and in response, initiates a response action. The client also captures the communication log, the application log and application cache corresponding to the user application.

18 Claims, 7 Drawing Sheets

(56) References Cited

U.S. PATENT DOCUMENTS

| | | | |
|---|---|---|---|
| 2012/0230304 A1* | 9/2012 | Barbu | H04W 48/18 370/338 |
| 2013/0132559 A1* | 5/2013 | Kotecha | H04L 43/0876 709/224 |
| 2014/0113646 A1* | 4/2014 | Maggenti | H04L 67/306 455/452.1 |
| 2014/0177464 A1* | 6/2014 | Kanamarlapudi | H04L 1/1848 370/252 |
| 2014/0243039 A1* | 8/2014 | Schmidt | H04W 4/90 455/552.1 |
| 2015/0003361 A1* | 1/2015 | Palat | H04W 52/0258 370/329 |
| 2015/0350932 A1* | 12/2015 | Da Silva | H04W 76/18 370/225 |
| 2016/0037425 A1* | 2/2016 | Van Lieshout | H04W 36/08 370/332 |
| 2016/0050136 A1* | 2/2016 | Bansal | H04L 43/022 709/224 |
| 2016/0360462 A1* | 12/2016 | Chockalingam | H04W 36/30 |
| 2017/0086119 A1* | 3/2017 | Xu | H04W 36/30 |
| 2017/0142018 A1* | 5/2017 | Agarwal | H04L 47/2475 |

* cited by examiner

SYSTEMS AND METHODS FOR ON-DEVICE ADAPTIVE SELF-EXECUTING DIAGNOSTICS TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

User Equipment (UE) (e.g., a mobile communication device) may occasionally experience faults or errors in runtime operations which manifest as restarts of the device, crashing of applications, freezing threads, or stalled data loading. The UE may be programmed by a manufacturer to report only certain types of errors that are occurring and/or have occurred on the device via the operating system. These operating system error logs may have defined intervals in which diagnostic data is logged and captured, without regard to the particular user operating the UE, the network with which the UE is connected, and/or the types of applications executed on the UE. Errors and faults experienced by UE's during execution may decrease the functioning of the device via slower execution speed, an increase of failed attempts to connect with the network, and/or wasted battery consumption due to repeated failures of requests from executing applications.

SUMMARY

In an embodiment, a system for adaptive self-executing diagnostics on user equipment (UE) is disclosed. The system includes a UE which comprises: a transceiver that communicatively couples the UE to a network; a memory storing a plurality of user applications and communication applications; and a processor coupled to the memory and transceiver via a communication bus. The UE also includes a client stored in the memory that, upon being executed and configuring at least the processor, the processor: monitors an application log and communication log based on API permissions for the plurality of user applications and communication applications. The processor measures, over a defined time period, a volume of application transactions processed by each of the plurality of user applications and a set of performance metrics associated with UE resource usage. The processor generates, in the memory, a custom device profile that establishes baselines for each of the plurality of user applications based on the volume of transactions and set of performance metrics measured. The processor then identifies any deviation from the baselines for each of the plurality of user applications, and creates a bounded threshold in the custom device profile for each of the user applications based on the deviations. The processor then detects that at least one of the plurality of user applications has exceeded the bounded threshold, and determines that the bounded threshold was exceeded for at least one user application based on at least one of an application trigger, a network trigger, or any combination thereof. In response to exceeding the bounded threshold, the processor captures the communication log, the application log and application cache corresponding to the user application. The processor transmits the application cache, application log, and the communication log to a network analysis server. Subsequent to transmission to the network analysis server, the processor receives a message comprising a modified threshold corresponding to at least the user application that exceeded the bounded threshold. Based on the message, the processor alters the custom device profile to use the modified threshold instead of the bounded threshold.

In an embodiment, a method for adaptive self-executing diagnostics on user equipment (UE) is disclosed. The method includes monitoring, by executing a client on a processor of a UE, an application log and communication log based on API permissions for a plurality of user applications and communication applications stored in memory of the UE. The method also comprises measuring, by the client over a defined time period, a volume of transactions processed by each of the plurality of user applications and a set of performance metrics associated with UE resource usage. The method continues with generating, in the memory by the client executing on the UE, a custom device profile that establishes baselines for each of the plurality of user applications based on the volume of transactions and set of performance metrics measured. The method includes identifying, by the client executing on the UE, any deviations from the baselines for each of the plurality of user applications, and creating, by the client executing on the UE, a bounded threshold in the custom device profile for each of the user applications based on the deviations. The method comprises detecting, by the client executing on the UE, that at least one of the plurality of user applications has exceeded the bounded threshold, and also determining, by the client executing on the UE, that the bounded threshold was exceeded for at least one user application based on at least one of an application trigger, a network trigger, or any combination thereof. In response to exceeding the bounded threshold: the method continues with extending, by the client executing on the UE, recording of data into the application log and the communication log, and also capturing, by the client executing on the UE, the communication log, the application log and application cache corresponding to the user application. The method further comprises creating, by the client executing on the UE, a diagnostic prompt that comprises an address corresponding to a network analysis server. The method then continues with requesting, via display of the diagnostic prompt on a user interface of the UE, permission to contact the network analysis server, and transmitting, by the client executing on the UE, the application cache, application log, and the communication log to at least the network analysis server.

In an embodiment, another method for adaptive self-executing diagnostics on user equipment (UE) is disclosed. The method comprises monitoring, by executing a client on a processor of a UE, an application log and communication log based on API permissions for a plurality of user applications and communication applications stored in memory of the UE. The method continues with measuring, by the client over a defined time period, a volume of transactions processed by each of the plurality of user applications and a set of performance metrics associated with UE resource usage. The method also includes generating, in the memory by the client executing on the UE, a custom device profile that establishes baselines for each of the plurality of user applications based on the volume of transactions and set of performance metrics measured. Next, the method comprises identifying, by the client executing on the UE, any deviations from the baselines for each of the plurality of user applications. The method includes creating, by the client executing on the UE, a bounded threshold in the custom device profile for each of the user applications based on the deviations, and also detecting, by the client executing on the UE, that at least one of the plurality of user applications has exceeded the bounded threshold. Determining, by the client executing on the UE, that the bounded threshold was exceeded for at least one user application is based on at least one an application trigger, a network trigger, or a combination thereof. In response to exceeding the bounded threshold, the method continues with initiating, by the client executing on the UE, a response action corresponding to the application trigger, the network trigger, or a combination thereof. The method further includes capturing, by the client executing on the UE, the communication log, the application log and application cache corresponding to the user application.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
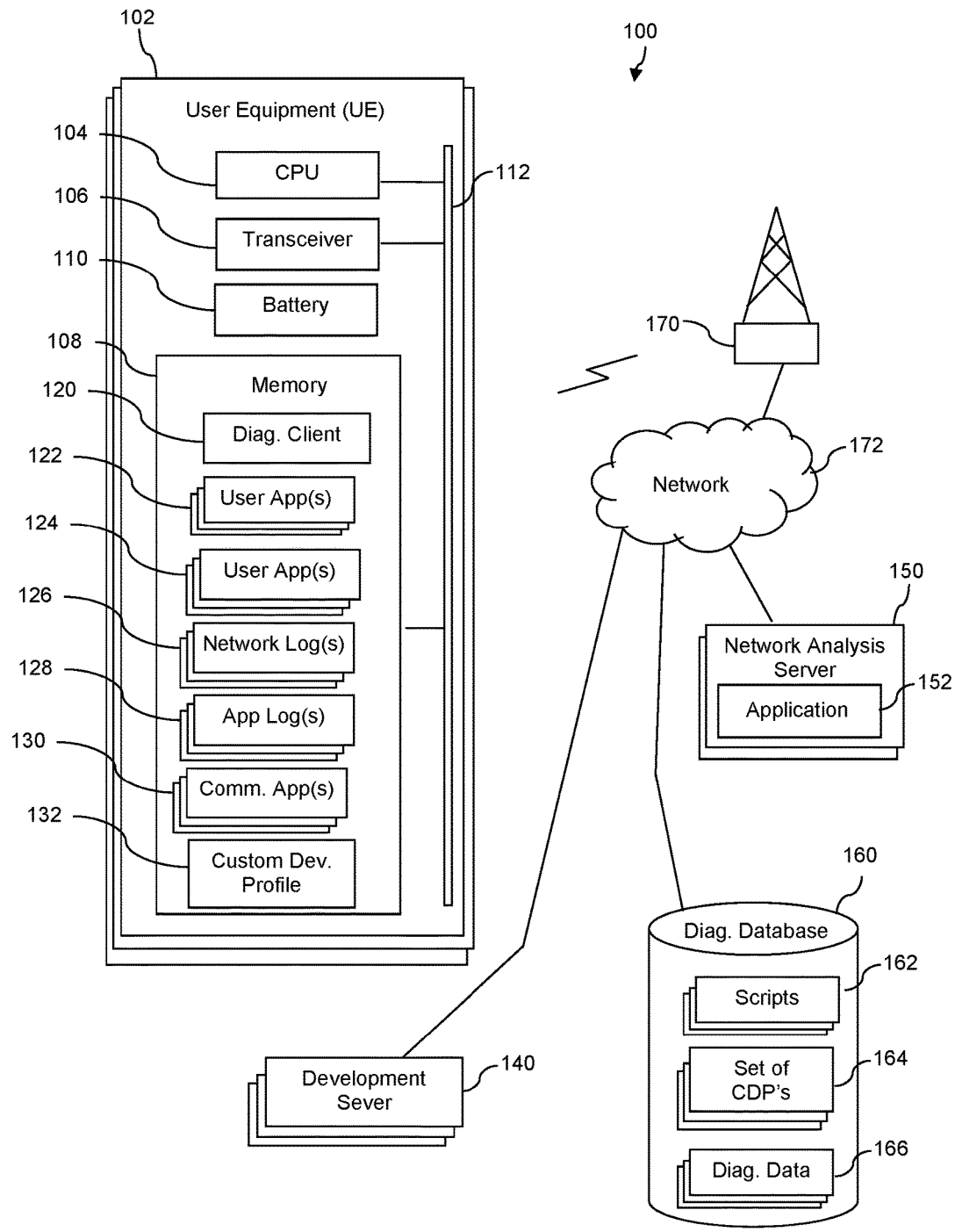
FIG. 1 is a diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Within communication networks, user equipment may experience errors or performance inefficiencies when executing applications irrespective of whether they are reported to a communication service provider. Some technical issues may manifest so as to be perceived by a user operating the user equipment, thus leading the user to contact the communication service provider or manufacturer about the issue. However, some technical issues may not be readily perceived by the user or occur with such infrequency that the issues are either not reported, under-reported, or reported after the fact, thereby making it difficult to diagnose, troubleshoot, and ultimately address the issues. Currently, the communication service provider may contact the user about a technical issue on the user equipment, have the user enter specific command prompts to initiate logging, and then have the user travel to a provider store so that the logs may be obtained for diagnosis. This can present technical challenges for the communication service provider because a processing error may be difficult to reproduce due to contextual data not being obtained while transient troubles occur.

Therefore, embodiments of the present disclosure teach systems and methods for an adaptive diagnostics client that is self-executing on the user equipment (UE). The diagnostic client may be pushed to the UE by a network server and self-execute at start-up of the UE. The diagnostic client monitors and measures the activity and characteristics of mobile applications installed on the UE interacting with users and with the network so as to establish norms. Specifically, the diagnostic client can monitor each mobile application to establish a baseline by taking into account current activity and values stored in application logs and communication logs. After a defined period of time, the diagnostic client creates individual thresholds of variance from the baseline norms for the applications based on deviations measured, and generates a custom device profile based on the unique behaviors and activity occurring on the UE. For example, the diagnostic client creates a custom device profile having the baselines and thresholds for each mobile application, and monitors the amount of application transactions involving voice calls, text messages, data communications requests, Bluetooth® connections, network roaming, and processor utilization per unit of time. The diagnostic client may adaptively modify the baselines and bounded thresholds (e.g., a defined difference from the baseline value to one or more threshold values) for each application over time as processing and/or communication interactions between applications and the network changes. This allows for a more dynamic and efficient mechanism for the diagnostic client to distinguish between intentional usage due to user interactions and possible processing inefficiencies or network connections errors that might otherwise be unnoticed by the end user.

When applications and/or communications of the UE vary beyond the bounded threshold defined in the custom device profile, the diagnostic client may recognize this event as a specific trigger so that a particular response is taken. For example, a user may typically place a voice call to another UE on his or her way home from work, and therefore the diagnostic client recognizes this as a baseline and records the time of day, location within the network, and communication technology typically used, such as LTE or GSM. Over time, the diagnostic client may identify that for the past three days, the user equipment attempting to place a voice call has received a response indicating a fast busy signal from the network. The diagnostic client detects that the fast busy signal is received after each of three successive reattempts on the UE. As such, the diagnostic client determines that a threshold was exceeded due to the network trigger of repeated fast busy signals received. Other examples of triggers that may correspond with a threshold being exceeded can pertain to voice quality, data latency, throughput, network connection type relative to past connections (e.g., using GSM when LTE is typically used), high battery consumption for a particular application, connection failures to external links from within a user application, Bluetooth® connectivity and connection quality, processor utilization, and roaming behaviors.

In response, the diagnostic client may create and present a diagnostic prompt on the display of the UE, where the diagnostic prompt is requesting permission to further diagnose the event, and capture application logs, network logs, and application cache associated with any application used when the threshold was exceeded. In some embodiments, the diagnostic client may extend the time interval with which data is recorded within an application log and/or communication log, thereby allowing for a broader dataset to diagnose and remediate issues. The diagnostic client stores captured information in a package, such as application logs, communication logs, mobile equipment identifications, date and time of event, and location of the UE within the network. To improve data security and decrease the likelihood that sensitive information is accessed by unauthorized parties, the diagnostic client may remove sensitive customer proprietary network information from the package before it is sent to a network analysis server. The diagnostic client may establish a secure communication channel and transmit the captured information to the network analysis server for further diagnosis.

In some embodiments, the network analysis server obtains information from a plurality of UE's each running a diagnostic client (e.g., diagnostic data packages having the captured information). The network analysis server may identify patterns of diagnostic data across multiple UE's by correlation of software and/or firmware version numbers, the applications exceeding thresholds, and regions of the network that are reporting issues. For example, the network analysis server may determine that a certain geographical location in the network is reporting high connection failure rates from a social media application attempting to make video calls. The network analysis server may detect that the issue pertains to a wireless bandwidth channel (e.g., LTE at 5 MHz) being used by the UE's and is congesting the local cell sites. The network analysis server may create a modified threshold for the UE's to integrate into their custom device profiles, and instruct the diagnostic client to switch the UE's transceiver to using a different wireless bandwidth channel (e.g., LTE at 20 Mhz). Additionally, the modified threshold may be lowered from the original threshold so as to make the diagnostic client more sensitive to the number of failed connection requests attempted before action is taken. This may alleviate network congestion and improve the functioning of the UE's by reducing the number of failed attempts and more efficiently utilizing the processor. The diagnostic client also allows for individualized contact with a development server that handles the release of new versions of software and/or firmware for the UE. By this, the development server provides a quicker response time for addressing potential processing inefficiencies, thereby improving the functioning of the network and UE, while also allowing for an enhanced customer experience on the service provider network.

The preceding paragraphs are not intended to be limiting, but are illustrative of example benefits of the system and methods described by this disclosure according to some embodiments. Examples of systems and methods will now be described in more detail according to some embodiments of the present disclosure.

Turning now to FIG. 1, an embodiment of system 100 is illustrated. In an embodiment, system 100 comprises user equipment (UE) 102, cell site 170, network 172, diagnostic database 160, network analysis server 150, and development server 140. The network analysis server 150 may be configured by a diagnostic application(s) 152 via execution of a processor(s), where network diagnostic application 152 is stored in memory accessible to network server 150. In an embodiment, at least cell site 170 may be implemented within system 100 to facilitate and/or provide a wired and/or wireless communication link to one or more UE 102 and communicatively couple it to the network 172. It is understood that, in some embodiments, the total number of UE 102 may be in the thousands and/or millions and a plurality of cell sites 170 may collectively be implemented to facilitate and/or provide wireless communication links and coupling to the network 172.

In an embodiment, at least the cell site 170 is configured to provide a wireless communication link to the UE 102 according to at least one wireless communication standard, such as 3GPP, Long Term Evolution (LTE), Worldwide interoperability for Microwave Access (WiMAX), High Speed Packet Access (HSPA), Code Division Multiple Access (CDMA), Global System for Mobile Communication (GSM), Bluetooth®, Wi-Fi, or any combination thereof. A cell site may, in some embodiments, be referred to according to the communication technology with which it supports, such as being referred to a Node B and/or enhanced Node B (eNB) for corresponding to an LTE technology, or a base transceiver station (BTS) for corresponding to a GSM technology. In some embodiments, one or more cell sites 170 may comprise elements that are distributed in location and certain elements may be co-located in physical structures separate from other elements, but communicatively coupled wired and/or wirelessly to collectively comprise the cell site. Embodiments of network 172 may comprise a public network, private network, wired network, wireless network, or any combination thereof and comply with the wireless standards discussed above. In an embodiment, the UE 102 may include a variety of form factors, such as a mobile phone (including smart phones), tablet computer, wearable computing device (e.g., smart watch, smart glasses, helmet cam, etc.), digital media player, electronic book readers, notebook computer, a personal computer having an integrated or external wireless network communication device, game platforms, or other non-generic devices that may be configured for wired and/or wireless communication. It is understood that embodiments of devices within the present disclosure (e.g., UE 102, network analysis server 150, development server 140, etc.) are non-generic, particular machines that operate and function based on the features disclosed herein.

Therefore, in an embodiment, the system 100 may comprise network analysis server 150 configured by network diagnostic application 152 to support the detection, analysis, and remediation of errors occurring within the communication network (e.g., at cell site 170) and/or on UE 102 connected to it. In some embodiments, at least a portion of the network diagnostic application 152 may be distributed across multiple servers and/or executed by a processor of a cell site, such as 170. Each cell site (e.g., 170) may be identified by the network analysis server 150 via a cell site identifier, and the network analysis server 150 and/or UE 102 may identify which cell sites are typically used for wireless communication with the network 172. Cell site 170 may be configured to support one or more wireless communication technology at a particular frequency band, such as a frequency between 3 MHz-3000 GHz. For example, the transceiver 106 of UE 102 may be operable to communicate with cell site 180 over LTE technology at both a 5 MHz and a 20 MHz bandwidth, each having a particular signal strength within the network 172. Cell site 170 may generate alarms, alerts, and/or other signals that identify a malfunction incurred. For example, a malfunction may include alarms above a threshold, metric(s) being out of bounds from expected operation (i.e., is above and/or below predefined levels for the element), repeated dropping of calls despite being within the bounds of expected communication volume and signal strength, and/or decreased voice call quality for certain communication technology. The network analysis server 150 may assist UE 102 in verifying whether errors experienced by the UE 102 are shared among other UE's on the network 172, or specific to the particular UE 102.

It is understood that UE 102 may be utilized to implement systems and methods of the present disclosure. In an embodiment, UE 102 comprises a radio transceiver 106 that communicatively couples the UE 102 to a network 172, such as via cell site 170. The UE 102 comprises memory 108 storing a plurality of communication applications 130 and a plurality of user applications, such as user application 122 and user application 124. The memory 108 and its contents are communicatively coupled to processor 104 and radio transceiver 106 via communication bus 112. The memory 108 is readable by one or more processor 104 via at least one communication bus 112 and the memory 108 includes a non-transitory storage medium having non-volatile memory and/or storage elements. The UE 102 comprises battery 110 that powers the UE 102 and its contents. Battery performance metrics (e.g., recharge cycles, amount of consumption per application, average recharge time, etc.) and information about the battery (maximum battery capacity in Amp-hrs, manufacturer, date of manufacture, serial number, etc.) may be measured and stored in logs (e.g., at least one of network logs 126 and/or application logs 128). A diagnostic client application 120 (referred to hereafter as client 120) may be stored in memory 108 and configure the UE 102 upon execution by processor 104. The client 120 may self-execute upon the UE 102 being powered-up and run in the back-ground thereafter. In some embodiments, the client 120 may be pushed to memory 108 as stand-alone software and/or embedded within firmware from a server of the communication service provider, such as development server 140 and/or network analysis server 150.

User applications (e.g., 122, 124) may include applications that are installed in the memory 108 and which the user interacts with on the UE 102. For example, user applications may include gaming applications, social media applications, web browser applications, weather applications, media (e.g., audio and video) applications, photography applications, educational applications, travel applications, organization and calendar applications, financial applications, or combinations thereof. Each user application (e.g., 122, 124) may correspond with application programming interface (API) permissions that allow certain information (e.g., application logs 128) to be accessed and extracted by an authorized entity (e.g., diagnostic client 120). In some embodiments, API permissions are set based on at least one of user input, manufacturer settings, developer settings, telecommunication provider settings, or a combination thereof.

Similarly, communication application(s) 130 may also have API permissions so that client 120 can access the information for monitoring and measurement. Examples of communication application(s) 130 include front-facing, background, and supporting applications that allow for connection with network 172 and other user equipment on the network 172. For example, communication application (s) 130 may include email applications, messaging applications, voice and video call applications, background applications that interface with user applications 122, 124 for establishing and maintaining communication links with the network, communication and resource usage applications that provide statistics of the resources used by the UE 102. The statistics and metrics about the resources used by the UE 102 may be logged within a network log 126 stored in memory 108.

Each user application, such as application 122 and application 124 may generate application log(s) 128 as they execute. The application log 128 may be rolling logs, such that information is stored over a defined time period, and once the time period expires, the oldest information is removed so that new information about the application activities can be stored. Application log 128 may comprise information related to the application transactions, which are the activity and errors experienced by the applications 122, 124. The application transactions in the application log 128 may be measured by client 120 according to volume. For example, the application transactions measured by the client corresponds with, but is not limited to, at least one of: how often an application (e.g., one of user applications 122, 124) is loaded on the UE 102 (i.e., launched and executed by processor 104), how many requests per second the application (e.g., one of user applications 122, 124) makes of the processor 104, how many times the application transmits page requests based on communication links embedded within application (e.g., embedded hyperlinks), the identification of other applications that execute in response to input from the user (e.g., if the user input launches a gaming application and that gaming application in turn launches one of the communication applications 130 to contact a gaming server and/or determine a location of the UE 102 for gameplay), time of day in which an application is executed (e.g., a mapping application is launched between 5:00-6:00 PM each weekday), amount of ad requests made by an application (e.g., a news application making digital ad requests to an ad gateway at a defined time or upon a specific input from the user), or any combination thereof. In some embodiments, the application log 128 may take the form of a data structure or file, with information stored in rows in conjunction with a time stamp of occurrence.

Similar to application log 128, one or more communication applications 130 may generate and store performance metrics in at least one network log 126. In an embodiment, network log 126 has a set of performance metrics associated with UE 102 resource usage measured by client 120. The set of performance metrics within the network log 126 may comprise at least one of: an amount of processor usage consumed by an application (e.g., how much processor usage is consumed by a social media application compared to a gaming application, with measurement in terms of time and percent utilization), frequency with which short-range wireless communication is used (e.g., how often the UE 102 engages and conducts communication activities such as via a Bluetooth® connection), identification of which communication technology the transceiver is using to couple to the network (e.g., how long and how often GSM is used versus LTE versus wi-fi), identification of channel bandwidth used by the communication technology (e.g., identifying whether the UE 102 is connecting using LTE at 20 MHz bandwidth or LTE on the 5 MHz bandwidth), amount of voice call drops (e.g., the frequency with which voice calls are disconnected and/or connections lost relative to the overall amount of voice calls placed and received on the UE 102), amount of fast busy signals (e.g., how often a call placed by the UE 102 results in a reorder tone indicating that no transmission path to the called number is available), amount of straight to voicemail signals (e.g., how often the UE 102 is unable to make a connection with another UE and instead the voice or video call goes straight to voicemail), level of voice quality (e.g., measured value of mean opinion score on public switched telephone networks and/or voice over internet protocol networks), amount of data latency (e.g., measured time it takes for a packet of data to leave UE 102 and receive a response back from the end point on the network 172), amount of throughput (e.g., amount of data that is uploaded and/or downloaded in a defined time), number of times the UE is roaming on another network (e.g., UE 102 is typically in a given location but travels to another location that only has roaming service available), number of times the UE has been reset (e.g., how often the UE 102 has had a power-cycle and/or installation operating system on the device), rate at which the battery drains (e.g., the rate with which the battery 110 is used and depleted by a user application 122, 124 and/or a communication application 130), or any combination thereof.

The UE 102 is configured by execution of client 120 on processor 104. The client 120 monitors at least an application log 128 and network log 126 corresponding to one or more applications, such as user applications 122, 124 and/or communication application 130. In some embodiments, the client 120 may also monitor a task manager program embedded within an operating system of the UE 102, where the task manager tracks current resource usage on the UE 102. Thus, the client 120 may monitor and measure data in real time. The term real-time as used herein means that the information obtained by the client 120 is detected, learned, monitored, measured, collected, transmitted, and/or analyzed as processes and events happen on the UE 102 versus performing one or more of these actions in a batch processing mode of operation. In an embodiment, real-time monitoring, detection, creating, extraction, feeding, measurement, collection, transmission, and analysis of information related to processing activities may repeatedly take place according to a specific time interval, such as but not limited to every 10 milliseconds, 100 milliseconds, 1 second, 10 seconds, 1 minute, five minutes, every hour, or combinations thereof. The information and data being monitored may be based on API permissions for each user application 122, 124 and communication application 130. Thus, some applications may have more data monitored and measured than others due to the client 120 being granted more API permissions.

As the client 120 monitors at least application logs 128 and network logs 126, the client 120 may take measurements over a defined time period. The specific length of a defined time period may depend on what is being measured. The measurements may be used by the diagnostic client 120 to generate a custom device profile 132, which may comprise a data structure with rows of measured activity corresponding to one of the applications on the UE 102, where these measurements are used to establish baselines and thresholds. In some embodiments, each application (e.g., user applications 122, 124 and/or communication applications 130) may have their own time period defined for developing baselines within the custom device profile 132 that is generated by the client 120. For example, in an embodiment, user application 122 may be a social media application which is measured for a week before a baseline of activity is established and/or updated within the custom device profile 132, whereas user application 124 may be a navigation application that is used less frequently, and thus have a time period of multiple weeks before a baseline of activity is established for it. In some embodiments, measurements from communication applications 130 may be combined with information measured from user applications 122, 124 in order to establish a baseline of processing activity. In an embodiment where an application is updated with a new version (i.e., the application is reinstalled in memory), the client 120 may establish a separate baseline of processing activity, compare it with the baseline of the previous version, and if there is a difference between the two beyond a defined amount, then the client 120 may use the new (separate) baseline as the primary baseline. In an embodiment, the client 120 may provide a prompt that informs the user that the update to the application resulted in identified changes in the monitored activity. For example, the updated application may increase battery consumption relative to the old version. The client 120 may make the user aware of this and provide an option to remove the application from memory, thereby increasing storage space and providing more efficient use of the battery.

The client 120 may establish a baseline of activity that is unique to each application and that is stored within the custom device profile 132, and the baseline may be dynamically adjusted by client 120 and/or from an external source (e.g., network analysis server 150 and/or development server 140). In some embodiments, each application may correspond with more than one baseline in the custom device profile 132, thereby allowing the client 120 to dynamically adapt to externalities placed on the UE 102, such as but not limited to any of time, location, activity of other applications, network connection being implemented by radio transceiver 106, network equipment to which UE 102 is connected (e.g., UE 102 interacting with another UE via Bluetooth® versus UE 102 interacting with a back-end server), or combinations thereof.

In some embodiments, the client 120 may conduct measurements by accessing one or more of application logs 128, network logs 126, and/or other sources (such as a task manager), and pulling values from fields within the logs, cache, and/or programs. The client 120 may concatenate the pulled information with an identifier of the applications to which the information pertains (e.g., user applications 122 and communication applications 130). The client 120 may also retrieve the corresponding time and location of the UE 102 for the pulled information. In some embodiments, the measurements may be ongoing with information being pulled once the defined time period expires, and the baselines may be updated periodically. A history of the baselines used for each application may be stored in memory 108 and analyzed by client 120 over time to determine trends and in what scenarios each baseline should be implemented.

In some embodiments, measurements by client 120 may be in terms of a volume of application transactions processed by each user application (e.g., user applications 122, 124) and/or in terms of a set of performance metrics associated with UE 102 resource usage, as previously discussed herein. A baseline may be established by the client 120 taking an average of the values that were measured over the defined time period. In some embodiments, the average value used as the baseline may be measured in terms of one or more of their corresponding values, such as processor usage, battery usage, requests to the network, etc. One or more baselines may be stored in a field of the custom device profile 132.

The client 120 generates a custom device profile 132 based on the measured volume of application transactions processed by each of the user applications (e.g., 122, 124) and/or based on the measured set of performance metrics associated with UE resource usage. In some embodiments, client 120 may generate multiple custom device profiles 132 and identify each according to a specific user and/or unique profile of the UE 102. For example, client 120 may use the custom device profile 132 according to the user using the UE 102 based on the user log-in. A custom device profile 132 may be a data structure having identifiers of date, time, location, network equipment address, and/or mobile equipment identifier (MEID) that may be sent when information is sent to a server (e.g., network analysis server 150 and/or development server 140). For data security, in some embodiments, the client 120 does not include or obscure Customer Proprietary Network Information (CPNI) (i.e., identification of optional services in which the UE is subscribed to, current charges a UE has incurred with a service provider, and usage data for billing purposes) when sending diagnostic information (e.g., application logs 128, network logs 126, and/or other caches) via the network 172 (e.g., to servers 140, 150). A custom device profile 132 may comprise rows with fields indicating the user application (e.g., 122, 124), communication applications 130, baselines, and thresholds corresponding to each. In some embodiments, the custom device profile 132 assigns a weight value to each row and/or field so that monitoring of a certain application is weighted more heavily than others due to its relative importance on the UE 102 and/or to the telecommunications service provider. The weighted values assigned to each application may be between 1-10 (where 1 indicates lowest monitoring importance and 10 indicates highest monitoring importance). For example, the diagnostic client 120 may determine that a social media application is used more frequently than a photography application, and thus the social media application may be assigned a higher weight value such that deviations from the baseline of the social media application are monitored more closely and/or the thresholds of the social media application may be decreased from their original values (i.e., less deviation from the baseline would be permitted by the client 120).

Client 120 identifies deviations via a continued monitoring and measurement of current information and values relative to the baselines of each of the user applications 122, 124 and/or communication applications 130 within the custom device profile 132. For example, in an embodiment, user application 122 may be a social media application that typically consumes between 25-40% of processor 104 resources when in use, and makes between 2-5 ad requests per minute to an ad gateway (not shown) via network 172. These values may be reflected according to baseline in the custom device profile 132. The client 120 may also determine, from the baseline, that 15% of the battery usage per recharge cycle is due to the social media application executing. The client 120 may identify deviations from the baseline, and create thresholds that trigger certain actions to be taken by the client 120. Thus, the client 120 creates a bounded threshold (e.g., an upper boundary, lower boundary, or both relative to the baseline) in the custom device profile 132 for each of the applications (e.g., user applications 122, 124 and/or communication applications 130).

Client 120 detects when an application trigger and/or a network trigger occurs, which corresponds with a threshold being exceeded for at least one of the applications within the custom device profile 132. For example, in an embodiment where user application 122 is a social media application, the bounded threshold for user application 122 may be processor usage percentages of 15-50%, ad requests greater than 7 per minute, and battery usage above 50% per recharge cycle. When the monitored values exceed these bounded thresholds, the client 120 may determine that the threshold was exceeded and whether it corresponds with an application trigger and/or a network trigger. Put simply, if the client 120 determines that only the threshold for battery usage was exceeded, then this may correspond with only a network trigger, whereas if the bounded threshold for the number of ad requests was also exceeded, then the client 120 may determine that the bounded threshold was exceeded based on a network trigger as well.

The client 120 may use these triggers to determine if there is a correlation between the thresholds being exceeded, and the client 120 may take a specific action in response to the basis being an application trigger, a network trigger, or both. In some embodiments, the client 120 may determine the length of time with which a bounded threshold is exceeded. The client 120 may also adjust the bounded thresholds up or down after determining that an application's activity does not exceed the original bounded thresholds, but repeatedly comes close to exceeding them. As such, the bounded threshold may be adjusted so as to alert the development server 140 and/or network analysis server 150 to identify a cause for the behavior. The client 120 may detect an application trigger and/or a network trigger only after the measured values being analyzed are maintained in excess of the bounded threshold for a set time, such as the values exceeding the threshold for a set number of seconds, minutes, or hours, depending on the value being analyzed.

It is understood that the application triggers and network triggers should not be limited to the examples discussed above. The custom device profile 132 may include a plurality of application triggers and network triggers. An application trigger may correspond with, but should not be limited to, at least one of: an indication that an application does not load (e.g., user application 122, 124), an application that does not update (e.g., client 120 detecting failed update attempts beyond the corresponding bounded threshold), an application that crashes, communication links embedded within applications failing to connect with an intended target computer system (e.g., an ad gateway, a web server, a webpage provider, network analysis server 150, development server 140, etc.), change in battery usage for the application relative to a baseline battery usage, requests per second that the application requests of the processor and/or network, or any combination therein.

A network trigger may correspond with, but should not be limited to, at least one of: a level of voice quality being below a threshold (e.g., when repeated voice calls are below a set deviation from the mean opinion score baseline), a number of call drops being above a threshold, number of fast busy signals being above a threshold, number of straight to voicemail signals being above a threshold, frequency of international dialing being above a threshold, an amount of data latency being above a threshold (e.g., time with which an application receives a response from a request), an amount of throughput being below a threshold, identification that a specific connection type that is different than previously used by the UE (e.g., a user application typically uses LTE in a particular location and/or time of day, but the UE is now switching to GSM), identification of bandwidth that results in a change in application function (e.g., an application typically uses LTE at 20 MHz, but the bandwidth drops to 5 MHz thereby decreasing the application's functionality), signal strength being below a threshold, number of times Bluetooth® does not connect, number of times Bluetooth® drops connections, number of times a connection quality of the UE decreases, amount of times the UE is unable to roam on a network, amount of times the UE roams in a network, a processor utilization increases beyond a threshold for a specific user application or communication application, whether update has been installed on the UE within a predefined period prior to a threshold being exceeded, or any combination therein.

By way of example, a user application 124 may have repeated crashes in excess of the bounded threshold as defined in the custom device profile 132. The client 120 may refer to this as an application trigger, thus take a certain action in response because the bounded threshold was exceeded based on an application trigger. In some embodiments, the client 120 may also detect a network trigger because the client 120 determines that the same user application 124 has exceeded a number of page requests (e.g., requests for updated content and/or specific content within the application) to the cell site 170 within a time period defined in the custom device profile 132 (e.g., exceeded the bounded threshold of 50 page requests within 10 seconds), and thus qualifies as a network trigger. In some embodiments, the client 120 may self-diagnose possible causes for the bounded threshold being exceeded. For example, the client 120 may determine that the user application 124 repeatedly crashed only after the same application began making page requests in excess of the corresponding bounded threshold for page requests. The client 120 may detect that the page requests were not being answered, thus causing the user application 124 to make additional requests. The client 120 may analyze the time, location, and version identifier of the user application 124 and whether an update to it or another application has occurred on the UE 102 within a defined time frame. The client 120 may determine that the user application 124 and/or an operating system of the UE 102 was recently upgraded, and thus perform an action in response to the triggers, such as informing an network analysis server 150 and/or a development server 140 of the findings and possible causes. In some embodiments, the errors incurred by the applications may not be so severe as crashes of the application, which might prompt the user to delete the application or call customer service. Instead, the client 120 may detect that a bounded threshold is exceeded because of higher processor usage, which might not be noticed by the user, but would be noticeable due to battery drainage increasing. Thus, the client 120 improves the functioning of the UE 102 by identifying inefficiencies in the operations of the UE 102, detecting possible causes, and in some embodiments, taking remedial action to alleviate the error. Thus, the client 120 may provide for decrease battery drain and more efficient processor usage than if the activities continued unnoticed.

In response to the bounded threshold being exceeded based on an application trigger and/or a network trigger, the client 120 may identify the action to be taken according to the particular application trigger and/or network trigger, with the specific action defined in the custom device profile 132. For example, in response to exceeding the bounded threshold, the client 120 may determine that the defined response is to capture the network log 126, the application log 128 and application cache corresponding to the user application (e.g., temporary memory from the particular user application and/or communication application at the time the threshold was exceeded). The client 120 captures the information by taking a snapshot (i.e., saving identified values in memory) of the logs and cache, as well as other identifying information such as MEID, location, and time of the trigger, which can subsequently be transmitted to network analysis server 150 and/or development server 140. In some embodiments, the application trigger and/or network trigger (caused by exceeding a threshold) may result in the client 120 extending recording of data into the application log 128 and/or the network log 126, which delays at least a portion of data within the logs from being overwritten by extending the time period with which information is captured within the log, thereby allowing additional time before the oldest information is overwritten, archived, and/or purged.

In some embodiments, when a threshold is exceeded due to an application trigger and/or network trigger, the client 120 may then identify the user application 122, 124 and/or communication application 130 corresponding to the threshold being exceeded, create a diagnostic prompt that comprises an address corresponding to a server (e.g., an network analysis server 150 and/or a development server 140), and request, via display of the diagnostic prompt on a user interface of the UE 102, permission to contact that server. This may provide an opportunity for the client 120 to gauge whether the user has noticed any error or malfunction, while also providing for an opportunity for the client 120 to gain permission to send information to a third party. In response to permission being granted via the diagnostic prompt, the client 120 may transmit captured information to a third party for analysis (e.g., network analysis server 150, development server 140, and/or servers associated with a vendor), where the captured information includes the application cache, application log 128, the network log 126, identifiers, and any adjustments to the bounded threshold (e.g., a modified threshold). In some embodiments, the client 120 may generate a diagnostic package comprising the captured information, but specifically exclude and/or obscure certain information (e.g., CPNI or other sensitive information) from being included in the diagnostic package. The client 120 may transmit the captured information (e.g., application cache, application log 128, network log 126) to the network analysis server 150 for additional analysis. In some embodiments, the client 120 may periodically ping (e.g., sending a message and waiting for a reply) the network analysis server 150 to ensure that a connection is possible, and if not, the client 120 may identify the lack of response as a network trigger which and capture network logs for inclusion in the custom device profile 132 before the information is overwritten.

The network analysis server 150 may be associated with a telecommunication carrier and the network analysis server 150 is configured by an application to receive diagnostic packages from a plurality of UE's on via network 172. The network analysis server 150 may unwrap the diagnostic packages received (e.g., extract any custom device profile 132, the application cache, application log 128, and network log 126 sent by UE 102) and determine if any correlation exists between the location, time, and/or model of the UE 102 and other UE's that may have sent their captured information. The network analysis server 150 may access diagnostic database 160 to retrieve at least one of a plurality of diagnostic data 166 that is received from UE's across the network 172. In some embodiments, the diagnostic database 160 may store a set of copies 164 comprising each the custom device profile 132 created by each UE 102 running the client 120. The network analysis server 150 may determine that the boundary for a particular user application (e.g., 122, 124) on UE 102 was exceeded because of a location or time associated with irregularities occurring on the network. For example, the network analysis server 150 may determine that the UE 102 exceeded a bounded threshold because cell site 170 was undergoing a software and/or hardware maintenance upgrade at that time, and thus the network analysis server 150 can report back to the client 120 whether the boundaries should or should not be adjusted. Based on whether a threshold should be adjusted, the network diagnostic application 152 may pull one or more scripts 162 from diagnosis database 160 that defines how much the threshold should be adjusted. Thus, if a boundary is to be adjusted, the network analysis server 150 may create a modified threshold based on the captured information coming from a plurality of UE's and/or scripts 162.

Subsequent to the client 120 transmitting the captured information to the network analysis server 150, the network analysis server 150 may determine that a modified threshold should be used for one of the applications being monitored (e.g., user applications 122, 124) on UE 102. For example, the modified threshold may adjust the upper boundary by 5% to account for changes in network load when the UE 102 is in a certain location and/or on the network at a specific time of day. The modified threshold may be stored in the custom device profile 132 on the UE 102 and/or database 160. Creating and using the modified threshold may improve the ability of the client 102 to recognize performance inefficiencies on the UE 102, thereby promoting a more stable and efficient use of processing and network resources. The network analysis server 150 sends and/or pushes a message comprising the modified threshold to the UE 102, where the message and modified threshold identifies and corresponds to at least one of the applications that exceeded the bounded threshold (e.g., user application 122, 124). Based on the received message, the client 120 accesses the custom device profile 132, extracts the identifier from the message, locates the corresponding row for the user application (e.g., 122, 124) and alters the custom device profile 132 to use the modified threshold instead of the bounded threshold. In some embodiments, the client 120 retains each of the original bounded threshold and the modified threshold within the custom device profile 132. The client 120 may condition the use of the modified threshold and/or bounded threshold on determination of a location, time, user log-in, and/or processing load of the UE 102.

In some embodiments, the client 120 may (a)periodically update a development server 140 as to the actions taken by the client 120 for further diagnosis of technical issues on the UE 102 and/or network 172 that may need to be addressed. For example, the client 120 may identify the user application (e.g., 122, 124) corresponding to the threshold being exceeded (e.g., the bounded threshold and/or modified threshold), create a diagnostic prompt that comprises an address (e.g., an IP address) corresponding to a development server 140, and request, via display of the diagnostic prompt on a user interface of the UE 102, permission to contact the development server 140. In response to permission being granted, the client 120 may use the API to obtain captured information (e.g., the application cache, application log, the communication log, MEID, the bounded threshold and/or the modified threshold) and transmit the captured information to the development server 140.

The development server 140 may be communicatively coupled to the network analysis server 150 and control what actions may remediate the thresholds being exceeded on the UE 102. For example, the development server 140 may determine that a specific version of firmware is being used on a plurality of UE's that each share the same model and manufacturer. The development server 140 may update software within the network 172 to more efficiently interact with the firmware on the UE 102.

Figure 2:
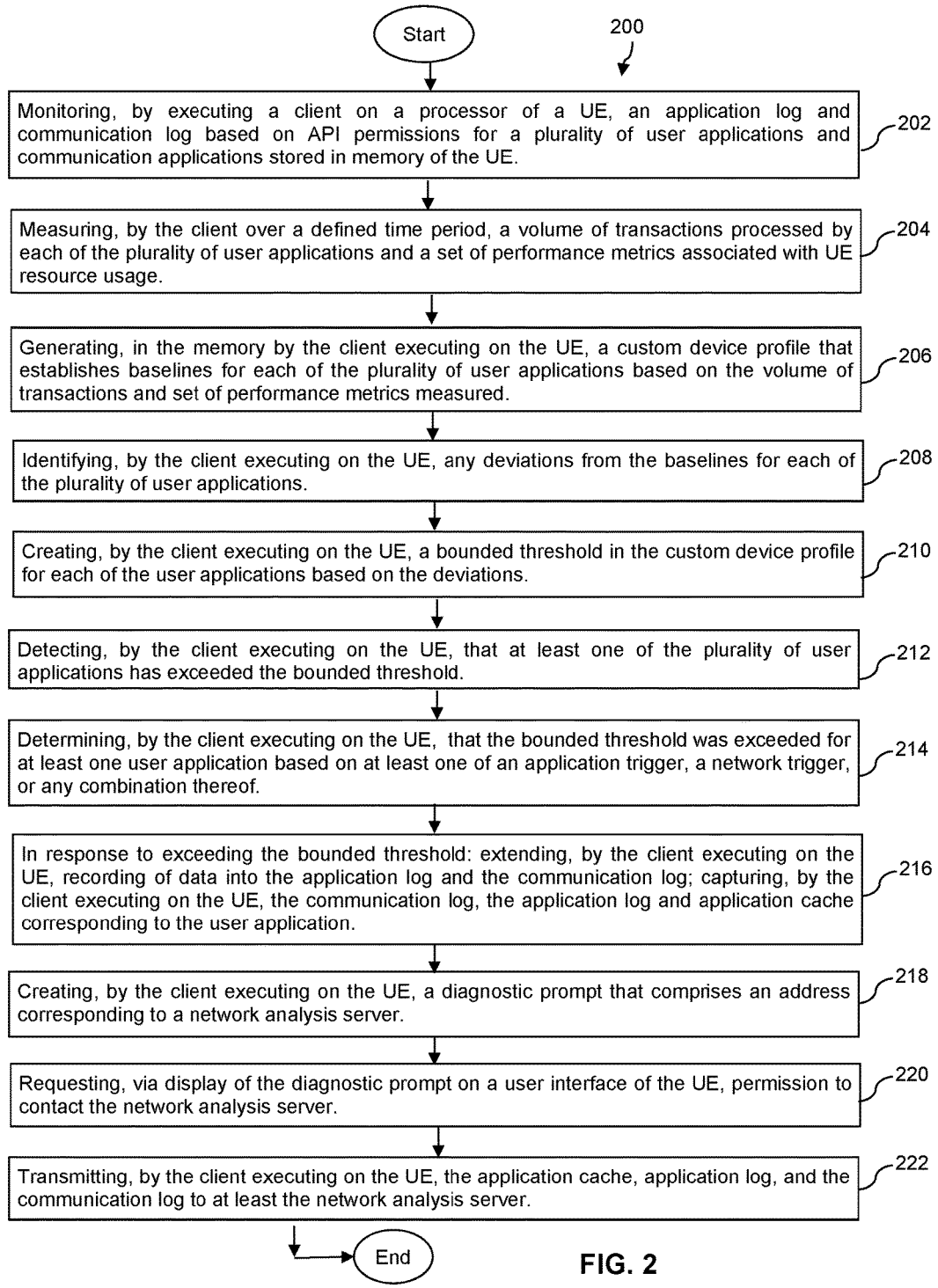
FIG. 2 illustrates an example method according to an embodiment of the disclosure.
Figure 3:
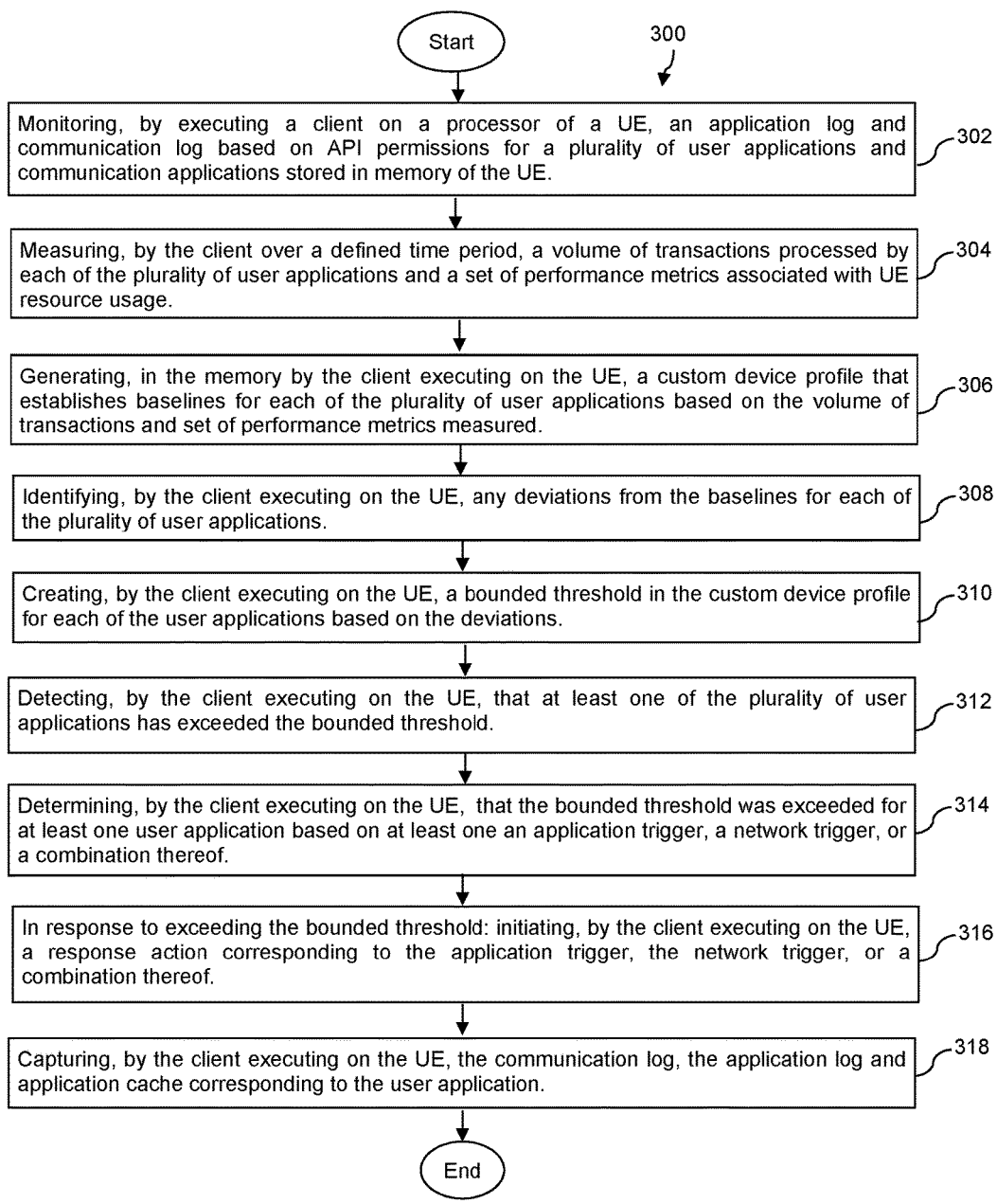
FIG. 3 illustrates an example method according to another embodiment of the disclosure.

FIGS. 2 and 3 are flowcharts of example method 200 and method 300, respectively, for adaptive self-executing diagnostics on user equipment. The methods 200 and 300 may be implemented, in whole or in part, by embodiments disclosed herein, such as system 100 of FIG. 1, or another suitable non-generic device and/or non-generic system such as discussed with respect to FIGS. 4-7. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

Turning now to FIG. 2 with reference to features of an embodiment of FIG. 1, a method 200 for adaptive self-executing diagnostics on user equipment (UE) is disclosed. At step 202, the method 200 comprises monitoring, by executing a client on a processor of a UE, an application log and communication log for a plurality of user applications and communication applications stored in memory of the UE. The client may monitor based on API permissions granted by the user applications and/or communication applications.

At step 204 the client is measuring, over a defined time period, a volume of transactions processed by each of the plurality of user applications and measuring a set of performance metrics associated with UE resource usage (e.g., percentage of load on the processor). Based on the volume of transactions and set of performance metrics measured, at step 206 the client is generating, in the memory of the UE, a custom device profile that establishes baselines for each of the plurality of applications (e.g., user applications and/or communication applications).

At step 208, the client executing on the UE is identifying any deviations from the baselines for each of the plurality of user applications. Based on the deviations, at step 210 the client is creating a bounded threshold in the custom device profile for each of the user applications. The method 200 may continue with the client monitoring the application log and communication log once the bounded threshold is created for one or more applications. At step 212, the client is detecting that at least one of the plurality of user applications has exceeded the bounded threshold. This may occur by the client referencing current activity of the application log, communication log, and/or in a task manager of the UE, and determining that the bounded threshold is exceeded for a defined period of time.

The method 200 continues at step 214 with the client determining that the bounded threshold was exceeded for at least one user application based on at least one of an application trigger, a network trigger, or any combination thereof. In some embodiments, an application trigger corresponds with at least one of: an indication that an application does not load, an application that does not update, an application that crashes, communication links embedded within applications fail to connect with an intended target computer system, change in battery usage for the application relative to a baseline battery usage, requests per second coming from the application to the network, or any combination therein. A network trigger may correspond with at least one of: a level of voice quality being below a threshold, a number of call drops being above a threshold, number of fast busy signals being above a threshold, number of straight to voicemail signals being above a threshold, frequency of international dialing being above a threshold, an amount of data latency being above a threshold, an amount of throughput being below a threshold, identification that a specific connection type that is different than previously used by the UE, identification of channel bandwidth that results in signal strength being below a threshold, number of times Bluetooth® does not connect, number of times Bluetooth® drops connections, number of times a connection quality of the UE decreases, amount of times the UE is unable to roam on a network, amount of times the UE roams in a network, a processor utilization increases beyond a threshold for a specific user application or communication application, whether an update has been installed on the UE within a predefined period prior to a threshold being exceeded, or any combination therein.

In response to exceeding the bounded threshold, the method 200 continues at step 216 with the client extending recording of data into the application log and the communication log. In some embodiments, extending recording of data into the application log and the communication log delays at least a portion of data within the application log and the communication log from being overwritten. In response to exceeding the bounded threshold, the client also is capturing information such as the communication log, the application log and application cache corresponding to the user application that exceeded the threshold. The network triggers and application triggers may be one or more conditional rows of defined values within the custom device profile that the client refers to when determining whether the exceeded boundary is based on an application trigger and/or network trigger. For example, in some embodiments, the method 200 may also include the client identifying that the bounded threshold was exceeded based on a network trigger that indicates a signal strength is below a threshold when the UE connects to the network via an identified channel bandwidth. The client may further identify that a user application from the plurality of user applications is making requests to the network via the identified channel bandwidth (e.g., a social media application is making requests via a LTE 5 MHz connection despite the signal strength being below the threshold for a reliable connection as indicated in the custom device profile). In some embodiments, the client may take remedial action to improve the functioning of the UE prior to and/or in response to detection of the threshold being exceeded. For example, in some embodiments, the method 200 may include the client changing from the identified channel bandwidth (e.g., LTE 5 MHz band) to another channel bandwidth that has a higher signal strength (e.g., a LTE 20 MHz band) for at least as long as the user application is making requests to the network.

The method 200 continues at step 218 with the client creating a diagnostic prompt that comprises an address (e.g., an IP address) corresponding to a network analysis server. The network analysis server may receive and analyze information coming from a plurality of UE's across the network. At step 220, the client is requesting, via display of the diagnostic prompt on a user interface of the UE, permission to contact the network analysis server. In some embodiments, the diagnostic prompt may simultaneously have an embedded application permissions request that obtains API permissions from one or more applications pursuant to permission being authorized. In some embodiments, permission to contact the network analysis server is granted via input from the user interface (e.g., through voice input and/or touch input).

At step 222, the method 200 continues with the client transmitting captured information to at least the network analysis server. For example, the captured information pulled by the client may comprise the application cache, application log, and the communication log, each of which includes values detailing activity leading up to and during the threshold being exceeded. The client may pull a mobile equipment identification of the UE and identifier of the application that exceeded the threshold. The client may wrap some and/or all of the captured information into a package without inclusion of customer proprietary network information (CPNI) in the package. This may promote customer anonymity and reduce possible leaks of sensitive customer information during transit across network channels to the network analysis server. In some embodiments, the client also transmits information to a development server. For example, in response to permission being granted via the diagnostic prompt, the method 200 may include the client transmitting the application cache, application log, the communication log, and thresholds to the development server. The thresholds may include a bounded threshold and a modified threshold, where the modified threshold corresponds with a higher and/or lower adjusted value relative to the bounded threshold. Transmission of information to the development server and/or network analysis server provides a more efficient use of processor and network resources by improving the speed with which processing abnormalities on the UE are discovered and remediated.

Turning now to FIG. 3, with reference to features of an embodiment of FIG. 1, a method 300 for adaptive self-executing diagnostics on user equipment (UE) is disclosed. At step 302, the client is executing on a processor of the UE and is monitoring an application log and communication log based on API permissions for a plurality of user applications and communication applications which are stored in memory of the UE. At step 304, the client is measuring, over a defined time period, a volume of transactions processed by each of the plurality of user applications and measuring a set of performance metrics associated with UE resource usage. The defined time period may differ according to the specific user application being measured. For example, a user application may be a social media application executed multiple times daily on the UE, and thus the defined time period for measuring the volume of transactions and set of performance metrics may be one week. Comparatively, another user application may be a navigation application executed a few times per week, and thus measurements may occur over the defined time period of multiple weeks in order to accurately capture the scope of the navigation application's activity on the UE.

Method 300 continues with step 306 in which the client is generating, in the memory on the UE, a custom device profile that establishes baselines for each of the plurality of user applications based on the volume of transactions and set of performance metrics measured. For example, the custom device profile may comprise a plurality of rows, where each user application corresponds to one or more rows, and each row has values for the baselines generated. The method 300 also includes step 308, where the client is identifying any deviations from the baselines for each of the plurality of user applications that are executing on the UE. At step 310, the client is creating a bounded threshold in the custom device profile for each of the user applications based on the deviations that were identified.

The client may continue monitoring and measuring the application log and communication log on the UE once the bounded threshold is created. At step 312, the method 300 continues with the client detecting that at least one of the plurality of user applications has exceeded the bounded threshold defined within the custom device profile. At step 314, the client is determining that the bounded threshold was exceeded for at least one user application based on at least one an application trigger, a network trigger, or a combination thereof. Each application trigger and/or network trigger may be a set of conditions (represented as values in the custom device profile) that are satisfied when the bounded threshold is exceeded.

In response to exceeding the bounded threshold, the method 300 continues at step 316 with the client initiating a response action corresponding to the application trigger, the network trigger, or a combination thereof. For example, in some embodiments, initiating the response action comprises at least one of: the client extending a time period in which data is recorded into the application log and the communication log; the client attempting to establish a data connection with the network analysis server; the client determining a location of the UE (e.g., wherein the network UE is located via trilateration and/or identification of communicatively coupled cell sites); and/or the client creating a prompt requesting permission to obtain a solution from a server based on the server analyzing data from a plurality of UE's on the network.

At step 318, the method 300 includes the client capturing information such as the communication log, the application log and application cache corresponding to the user application. In some embodiments, method 300 may also include the client identifying that the application trigger and the network trigger indicate that a user application from the plurality of user applications is making requests to the network via an identified channel bandwidth that is below a threshold for signal strength. For example, the UE may be connected to a cell site using an LTE connection which is at less than half of full signal strength measured by the UE. The client may determine that the user application is a social media application that repeatedly makes requests to the network while the signal strength is below threshold while on the LTE band. Upon making the identification, a response action taken by the client may comprise changing the UE's bandwidth on the identified channel to another bandwidth that has a higher signal strength for at least as long as the user application is making requests to the network. For example, the client may change from 5 MHz bandwidth to 20 MHz bandwidth while on LTE. In some embodiments, the method 300 may also include the client transmitting the application cache, application log, the communication log, and the response action initiated to at least the network analysis server.

Figure 4:
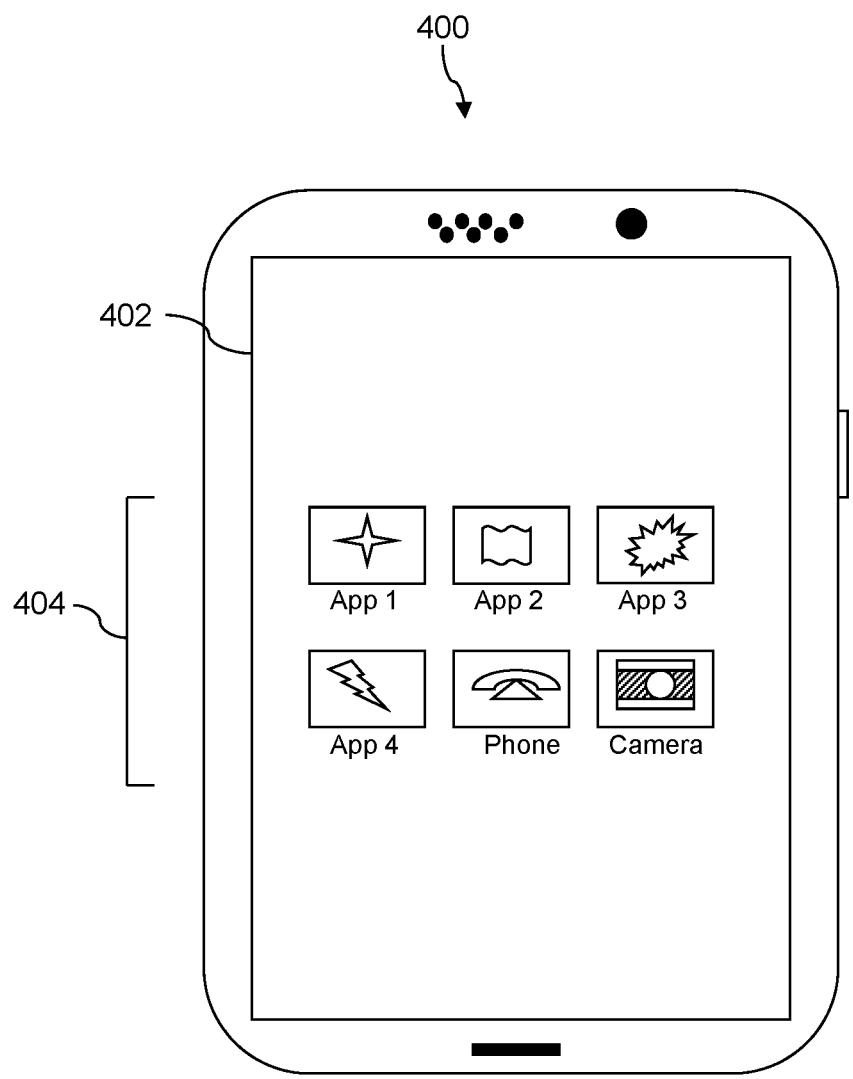
FIG. 4 is an illustration of a user equipment according to an embodiment of the disclosure.

FIG. 4 depicts an embodiment of user equipment (UE) 400, which is operable for implementing aspects of the present disclosure, but the present disclosure should not be limited to these implementations. Though illustrated as a mobile smart phone, the UE 400 may take various forms including a wireless handset, a pager, a personal digital assistant (PDA), a gaming device, or a media player. The UE 400 may be an example of and/or a specific embodiment of the UE 102 discussed above with reference to FIGS. 1-3. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. Some of the application icons 404 may be associated with applications installed in non-transitory memory of the UE and may be configured based on the individual profile, demographics, and/or history of a user associated with the UE 400.

In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the equipment. The UE 400 may further execute one or more software or firmware applications in response to user commands.

These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
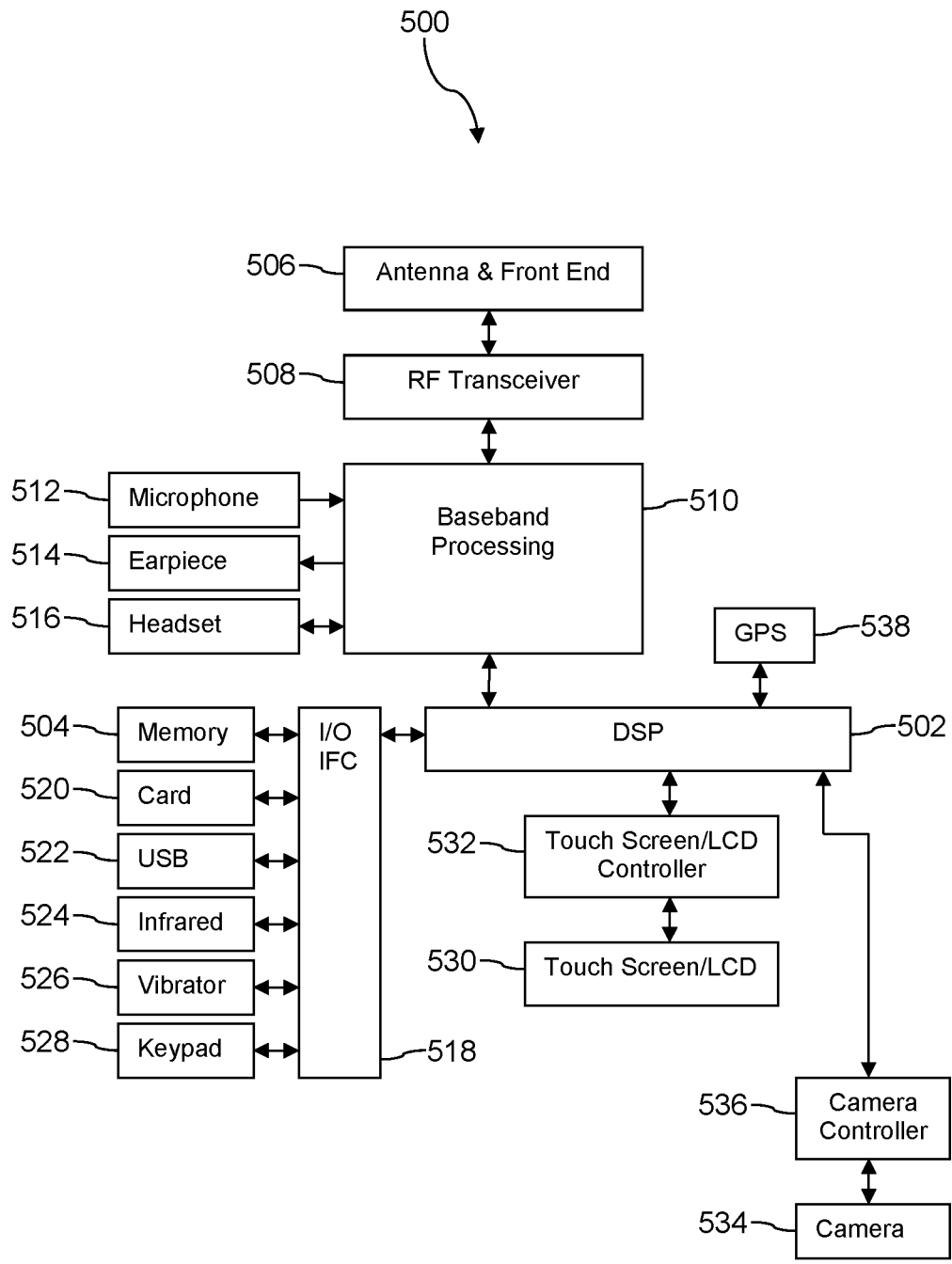
FIG. 5 is a block diagram of a hardware architecture of a user equipment according to an embodiment of the disclosure.

FIG. 5 shows a block diagram of circuitry in an embodiment of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the UE 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the UE 400 to determine its position.

Figure 6A:
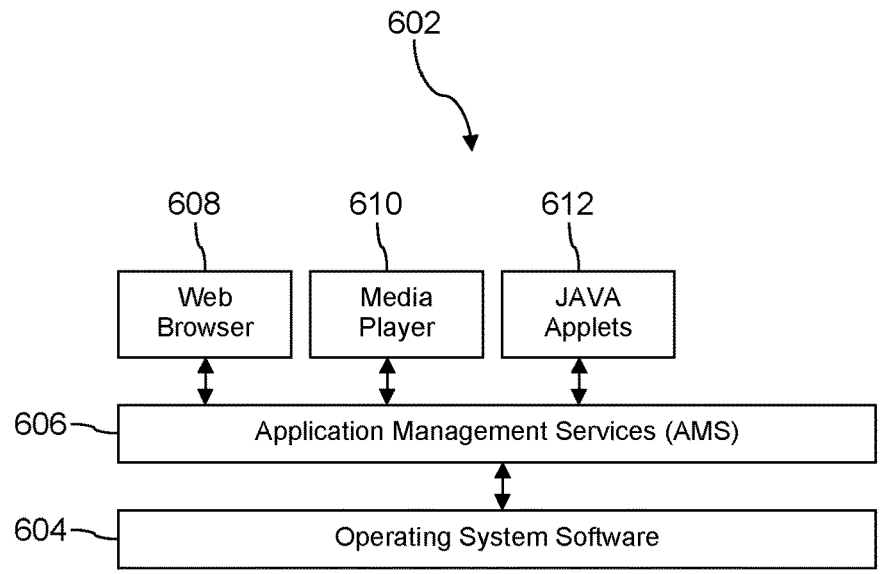
FIG. 6A is a block diagram of a software architecture of a user equipment according to an embodiment of the disclosure.

FIG. 6A illustrates a software environment 602 that may be implemented by the DSP 502, processors of a server (e.g., network analysis server 150 and/or development server 140), and/or within a cell site (e.g. at cell site 170 in FIG. 1). The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the mobile device 400 to provide a variety of functionality including games, utilities, and other functionality.

Figure 6B:
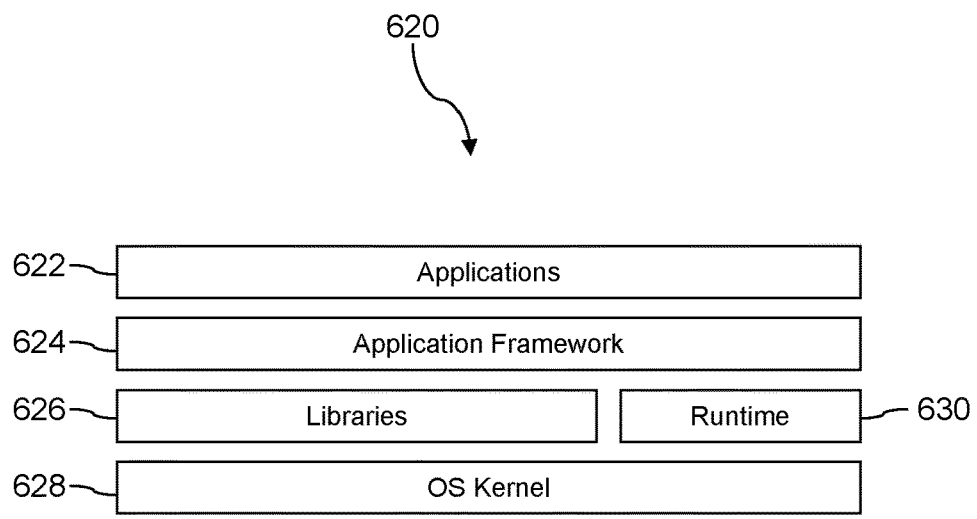
FIG. 6B is a block diagram of another software architecture of a user equipment according to an embodiment of the disclosure.

FIG. 6B illustrates an alternative software environment 620 that may be implemented by the DSP 502. The DSP 502 executes operating system kernel (OS kernel) 628 and an execution runtime 630, which reside at the system level of the User Equipment and, in some embodiments, their content (e.g., destination addresses) may not be alterable via download and interaction of software from a server over a network. The DSP 502 executes applications 622 that may execute in the execution runtime 630 and may rely upon services provided by the application framework 624. Applications 622 and the application framework 624 may rely upon functionality provided via the libraries 626.

Figure 7:
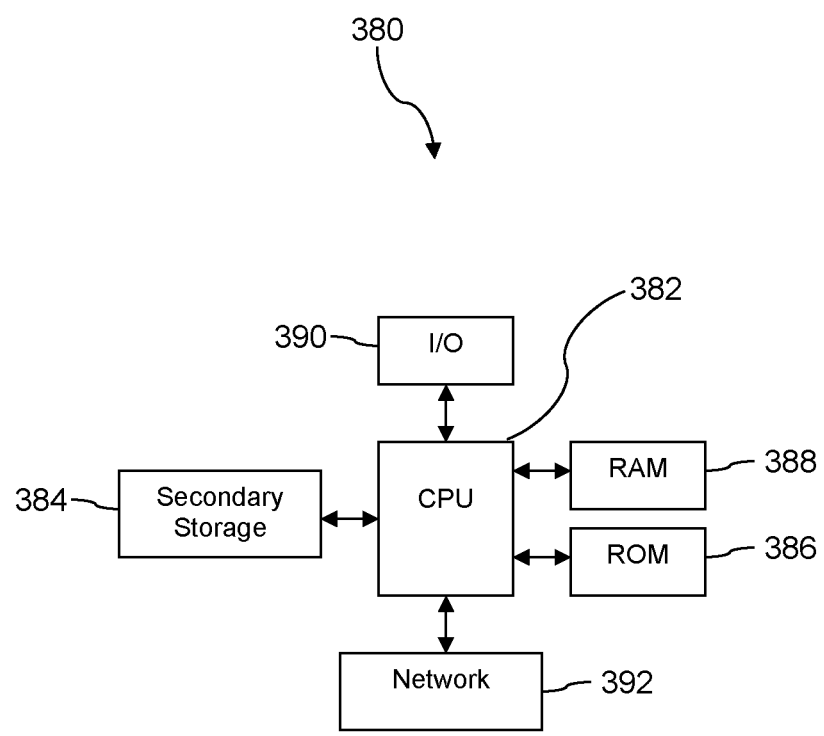
FIG. 7 illustrates an exemplary computer system suitable for implementing the several embodiments of the disclosure.

FIG. 7 illustrates a computer system 380 suitable for implementing one or more embodiments disclosed herein, such as features of system 100 in FIG. 1, including one or more UE 102, network analysis server 150, database 160, development server 140, cell site 170, and operations disclosed in FIGS. 2 and 3. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. It is understood that use of the term "memory" in the claims does not include transitory signals. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine, sometimes referred to as a special purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may be comprised on one or more non-transitory computer readable storage medium having computer executable program code embodied therein to implement the functionality disclosed above. The computer program product may comprise data structures, executable instructions, and other computer usable program code. The computer program product may be embodied in removable computer storage media, non-removable computer storage media, or any combination therein. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for adaptive self-executing diagnostics on user equipment (UE), the system comprising:
a UE comprising:
a radio transceiver that communicatively couples the UE to a wireless network;
a memory storing a plurality of user applications and a plurality of communication applications;
a processor coupled to the memory and the radio transceiver via a communication bus; and
a client stored in the memory that, upon being executed and configuring at least the processor, the processor:
monitors one or more application logs and one or more communication logs based on API permissions for the plurality of user applications and the plurality of communication applications, wherein the one or more application logs are generated by the plurality of user applications and comprise information associated with application transactions of the plurality of user applications, and wherein the one or more communication logs are generated by the plurality of communication applications and comprise performance information associated with UE resource usage,
measures, over a defined time period, a volume of application transactions processed by each of the plurality of user applications and a set of performance metrics associated with the UE resource usage,
generates, in the memory, a custom device profile that establishes baselines for each of the plurality of user applications based on the volume of transactions and the set of performance metrics measured,
identifies any deviation from the baselines for each of the plurality of user applications,
creates a bounded threshold in the custom device profile for each of the user applications based on the deviations,
detects that a user application of the plurality of user applications has exceeded the bounded threshold,
determines that the bounded threshold was exceeded for the user application based on at least one of an application trigger, a network trigger, or any combination thereof,
in response to exceeding the bounded threshold, captures a communication log of the one or more communication logs, an application log of the one or more application logs, and an application cache corresponding to the user application,
transmits the application cache, the application log, and the communication log to a network analysis server,
subsequent to transmission of the application cache, the application log, and the communication log to the network analysis server, receives a message from the network analysis server comprising a modified threshold corresponding to at least the user application that exceeded the bounded threshold, wherein the modified threshold is created based on one or more correlations between captured information associated with the user application from a plurality of UEs and information from one or more of the application log or the communication log, and
based on the message, alters the custom device profile to use the modified threshold instead of the bounded threshold.

2. The system of claim 1, wherein an application trigger corresponds with at least one of: an indication that an application does not load, an application that does not update, an application that crashes, communication links embedded within applications fail to connect with an intended target computer system, change in battery usage for the application relative to a baseline battery usage, requests per second to that the application requests of the processor, or any combination therein.

3. The system of claim 1, wherein a network trigger corresponds with at least one of: a level of voice quality being below a threshold, a number of call drops being above a threshold, number of fast busy signals being above a threshold, number of straight to voicemail signals being above a threshold, frequency of international dialing being above a threshold, an amount of data latency being above a threshold, an amount of throughput being below a threshold, identification that a specific connection type that is different than previously used by the UE, identification of channel bandwidth that results in a change in application function, signal strength being below a threshold, number of times a wireless connection via Bluetooth® fails to be established, number of times a wireless connection via Bluetooth® drops, number of times a connection quality of the UE decreases, amount of times the UE is unable to roam on a network, amount of times the UE roams in a network, a processor utilization increases beyond a threshold for a specific user application or communication application, whether update has been installed on the UE within a predefined period prior to a threshold being exceeded, or any combination therein.

4. The system of claim 1, wherein upon execution of the client, the processor of the UE further retains, in the custom device profile, each of the bounded threshold and the modified threshold for the user application.

5. The system of claim 1, wherein upon execution of the client, the processor of the UE further extends a time period in which data is recorded into the application log and the communication log in response to the bounded threshold being exceeded.

6. The system of claim 1, wherein upon execution of the client, the processor of the UE further:
   identifies the user application corresponding to the threshold being exceeded,
   creates a diagnostic prompt that comprises an address corresponding to a development server,
   requests, via display of the diagnostic prompt on a user interface of the UE, permission to contact the development server, and
   in response to permission being granted, transmits the application cache, the application log, the communication log, and the modified threshold to the development server.

7. The system of claim 1,
   wherein the volume of application transactions measured by the client corresponds with at least one of: how often an application is loaded on the UE, how many requests per second the application makes of the processor, how many times the application transmits page requests based on communication links embedded within application, the identification of other applications that execute in response to input from the user, time of day in which an application is executed, amount of ad requests made by an application, or any combination thereof, and
   wherein the set of performance metrics associated with UE resource usage measured comprises at least one of: amount of processor usage consumed by an application, frequency with which a wireless connection via Bluetooth® is used, identification of which communication technology the radio transceiver is using to couple to the wireless network, identification of channel bandwidth used by the communication technology, amount of voice call drops, amount of fast busy signals, amount of straight to voicemail signals, level of voice quality, amount of data latency, amount of throughput, number of times the UE is roaming on another network, number of times the UE has been reset, rate at which the battery drains, or any combination thereof.

8. A method for adaptive self-executing diagnostics on user equipment (UE), the method comprising:
   monitoring, by executing a client on a processor of a UE, one or more application logs and one or more communication logs based on API permissions for a plurality of user applications and a plurality of communication applications stored in memory of the UE, wherein the one or more application logs are generated by the plurality of user applications and comprise information associated with application transactions of the plurality of user applications, and wherein the one or more communication logs are generated by the plurality of communication applications and comprise performance information associated with UE resource usage;
   measuring, by the client over a defined time period, a volume of transactions processed by each of the plurality of user applications and a set of performance metrics associated with the UE resource usage;
   generating, in the memory by the client executing on the UE, a custom device profile that establishes baselines for each of the plurality of user applications based on the volume of transactions and the set of performance metrics measured;
   identifying, by the client executing on the UE, any deviations from the baselines for each of the plurality of user applications;
   creating, by the client executing on the UE, a bounded threshold in the custom device profile for each of the user applications based on the deviations;
   detecting, by the client executing on the UE, that a user application of the plurality of user applications has exceeded the bounded threshold;
   determining, by the client executing on the UE, that the bounded threshold was exceeded for the user application based on at least one of an application trigger, a network trigger, or any combination thereof;
   in response to exceeding the bounded threshold, extending, by the client executing on the UE, a time period with which information is captured in an application log of the one or more application logs and a communication log of the one or more communication logs corresponding to the user application such that at least a portion of data within the application log and the communication log is delayed from being overwritten;
   capturing, by the client executing on the UE, the communication log, the application log, and an application cache corresponding to the user application;
   creating, by the client executing on the UE, a diagnostic prompt that comprises an address corresponding to a network analysis server;
   requesting, via display of the diagnostic prompt on a user interface of the UE, permission to contact the network analysis server;
   in response to permission to contact the network analysis server being granted by a user of the UE via the diagnostic prompt, transmitting, by the client executing on the UE, the application cache, the application log, and the communication log to at least the network analysis server;
   subsequent to transmission of the application cache, the application log, and the communication log to the network analysis server, receiving, by the client, a message from the network analysis server comprising a modified threshold corresponding to at least the user application that exceeded the bounded threshold, wherein the modified threshold is created based on one or more correlations between captured information associated with the user application from a plurality of UEs and information from one or more of the application log or the communication log; and
   based on the message, altering, by the client, the custom device profile to use the modified threshold instead of the bounded threshold.

9. The method of claim 8, wherein an application trigger corresponds with at least one of: an indication that an application does not load, an application that does not update, an application that crashes, communication links embedded within applications fail to connect with an intended target computer system, change in battery usage for the application relative to a baseline battery usage, requests per second coming from the application to the network, or any combination therein.

10. The method of claim 8, wherein a network trigger corresponds with at least one of: a level of voice quality being below a threshold, a number of call drops being above a threshold, number of fast busy signals being above a threshold, number of straight to voicemail signals being above a threshold, frequency of international dialing being above a threshold, an amount of data latency being above a threshold, an amount of throughput being below a threshold, identification that a specific connection type that is different than previously used by the UE, identification of channel bandwidth that results in signal strength being below a threshold, number of times a wireless connection via Bluetooth® fails to be established, number of times a wireless connection via Bluetooth® drops, number of times a connection quality of the UE decreases, amount of times the UE is unable to roam on a network, amount of times the UE roams in a network, a processor utilization increases beyond a threshold for a specific user application or communication application, whether update has been installed on the UE within a predefined period prior to a threshold being exceeded, or any combination therein.

11. The method of claim 8, further comprising: in response to permission being granted via the diagnostic prompt, transmitting, by the client executing on the UE, the application cache, the application log, the communication log, and the modified threshold to a development server.

12. The method of claim 8, further comprising: identifying, by the client executing on the UE, that the bounded threshold was exceeded based on a network trigger which indicates that a signal strength is below a threshold when the UE connects to the network via an identified channel bandwidth.

13. The method of claim 12, further comprising:
identifying, by the client executing on the UE, that the user is making requests to the network via the identified channel bandwidth; and
changing, by the client executing on the UE, from the identified channel bandwidth to another channel bandwidth that has a higher signal strength for at least as long as the user application is making requests to the network.

14. The method of claim 8, wherein the UE comprises at least one of: a mobile phone, a media player, a laptop computer, a wearable computer, a tablet computer, or any combination thereof.

15. A method for adaptive self-executing diagnostics on user equipment (UE), the method comprising:
monitoring, by executing a client on a processor of a UE, one or more application logs and one or more communication logs based on API permissions for a plurality of user applications and a plurality of communication applications stored in memory of the UE, wherein the one or more application logs are generated by the plurality of user applications and comprise information associated with application transactions of the plurality of user applications, and wherein the one or more communication logs are generated by the plurality of communication applications and comprise performance information associated with UE resource usage;
measuring, by the client over a defined time period, a volume of transactions processed by each of the plurality of user applications and a set of performance metrics associated with the UE resource usage;
generating, in the memory by the client executing on the UE, a custom device profile that establishes baselines for each of the plurality of user applications based on the volume of transactions and the set of performance metrics measured;
identifying, by the client executing on the UE, any deviations from the baselines for each of the plurality of user applications;
creating, by the client executing on the UE, a bounded threshold in the custom device profile for each of the user applications based on the deviations;
detecting, by the client executing on the UE, that a user application of the plurality of user applications has exceeded the bounded threshold;
determining, by the client executing on the UE, that the bounded threshold was exceeded for the user application based on at least one of an application trigger, a network trigger, or a combination thereof;
in response to exceeding the bounded threshold:
initiating, by the client executing on the UE, a response action corresponding to the application trigger, the network trigger, or a combination thereof; and
capturing, by the client executing on the UE, the communication log, the application log, and an application cache corresponding to the user application;
transmitting, by the client, the application cache, the application log, and the communication log to a network analysis server;
subsequent to transmission of the application cache, the application log, and the communication log to the network analysis server, receiving, by the client, a message from the network analysis server comprising a modified threshold corresponding to at least the user application that exceeded the bounded threshold, wherein the modified threshold is created based on one or more correlations between captured information associated with the user application from a plurality of UEs and information from one or more of the application log or the communication log; and
based on the message, altering, by the client, the custom device profile to use the modified threshold instead of the bounded threshold.

16. The method of claim 15, wherein initiating the response action comprises the client executing at least one of: extending recording of data into the application log and the communication log, attempting to establish a data connection with the network analysis server, determining a location of the UE, creating a prompt requesting permission to obtain a solution from a server based on the server analyzing data from a plurality of UE's on the network.

17. The method of claim 15, further comprising: identifying, by the client executing on the UE, that the application trigger and the network trigger indicate that the user application is making requests to the network via an identified bandwidth that is below a threshold for signal strength.

18. The method of claim 17, wherein the response action comprises changing, by the client executing on the UE for at least as long as the user application is making requests to the network, from the identified bandwidth to another bandwidth.

* * * * *